United States Patent [19]

Yoshida et al.

[11] Patent Number: 4,851,899
[45] Date of Patent: Jul. 25, 1989

[54] FIELD-SEQUENTIAL COLOR TELEVISION CAMERA

[75] Inventors: Satoru Yoshida, Iwai; Sadafumi Kanada, Nagareyama, both of Japan

[73] Assignee: Victor Company of Japan, Ltd., Kanagawa, Japan

[21] Appl. No.: 200,155

[22] Filed: May 31, 1988

[30] Foreign Application Priority Data

May 30, 1987 [JP] Japan .................. 62-137367

[51] Int. Cl.$^4$ .............................................. H04N 9/04
[52] U.S. Cl. ........................................ 358/42; 358/75
[58] Field of Search .................. 358/41, 42, 43, 44, 358/75

[56] References Cited

U.S. PATENT DOCUMENTS 2,738,377 3/1956 Weighton ..................... 358/42 X
4,633,300 12/1986 Sakai ............................. 358/41
4,724,354 2/1988 Dill .................................. 358/41 X Primary Examiner—James J. Groody
Assistant Examiner—E. Anne Faris
Attorney, Agent, or Firm—Fleit, Jacobson, Cohn, Price Holman & Stern

[57] ABSTRACT

To prevent color turbidity due to residual image characteristics of an image sensor and to improve low color saturation due to rise-response characteristics of the image sensor, a object image to be taken is separated into three primary color images two fields by two fields for each primary color image through a color separating rotary filter; and transduced into six-field primary color image signals. Each primary color image signal obtained at each first field (this includes a preceding different-color residual image signal) is omitted, but each primary color image signal obtained at each second field (this includes a preceding same-color residual image signal) is outputted as video signals in sequence.

3 Claims, 8 Drawing Sheets

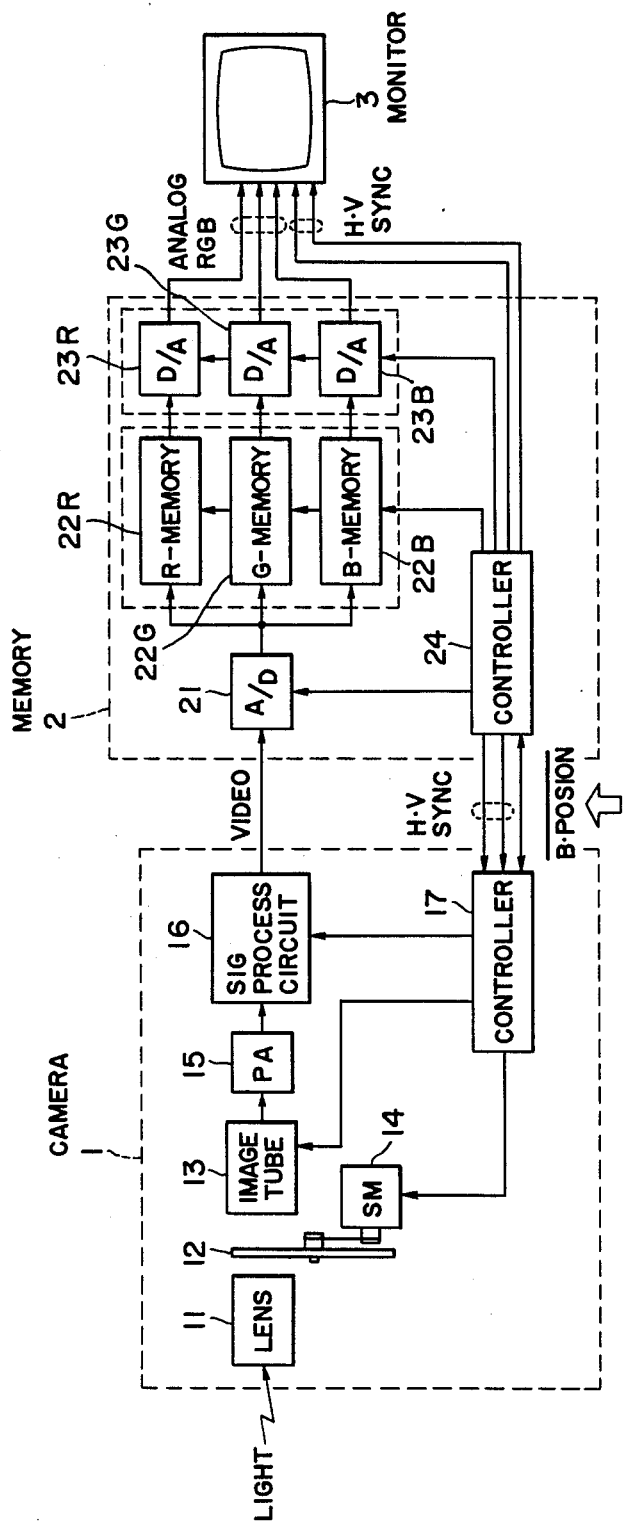
F I G. 5

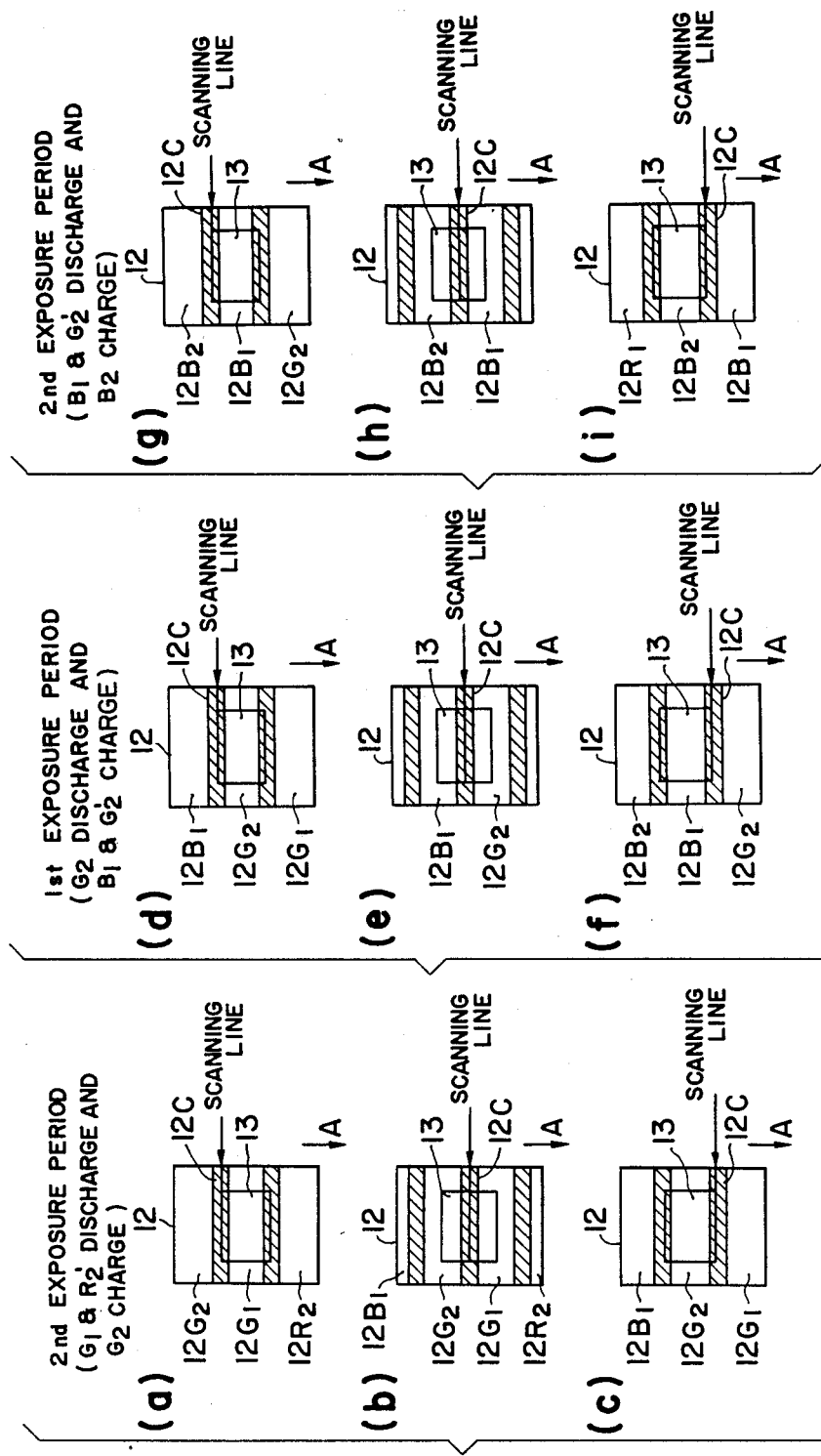

FIELD-SEQUENTIAL COLOR TELEVISION CAMERA

BACKGROUND OF THE INVENTION

1. Field of the Art

The present invention relates to a field-sequential color television camera for generating three primary color image signals of an object image field by field in sequence by scanning an image sensor which can transduce sequential primary color images into video signals

2. Prior Art

In recent years, a remarkable progress of computer-related digital processing technology has enabled a huge amount of information to be processed in a relatively simple system configuration. Further, since image processing technique has been developed with a remarkable progress in the above-mentioned digital processing technology, there exists a strong demand for low-priced high-quality image sensing devices connectable to a computer.

As one of image sensing devices which can satisfy the above-mentioned demand, field-sequential color television cameras are well-known. This is because this camera has various advantages such that the structure is simple, the size is small, and the cost is relatively low as compared with a simultaneous color television camera. Further, when compared with a single-tube color television camera having a color stripe filter, this camera provides a high picture resolving power because a single image tube is used in common for three primary colors in time sharing manner.

In this field-sequential color television camera, an image sensor is exposed to a single primary color image and then scanned to obtain the single primary color image field; thereafter the image sensor is exposed to another primary color image and then scanned to obtain the succeeding primary color image field; and the above operations are repeated in sequence to obtain video signals of red (R), green (G) and blue (B) in time-sharing method.

FIG. 1 shows an example of prior-art color separating rotary filters. This filter 100 formed with four sets of three primary color filter segments R, B and G is disposed in front of an image sensor and rotated in the arrow direction A in synchronism with field scanning operation, so that three primary color images can be applied in sequence onto the image sensor.

In the prior-art field-sequential color television camera, however, since the color filter segments for the respective three different primary colors are arranged continually one after another and therefore three primary color image signals of an object image are detected continually in sequence of field, there exists a problem in that it is impossible to obtain accurate primary color image signals due to after-image (residual image) characteritics of the image sensor, that is, residual photoelectric charge caused by high speed scanning operation. In more detail with reference to FIG. 2, a primary color image signal (e.g. green field signal) 103 is mixed with a residual signal 102 of another primary color image signal (e.g. preceding red field signal) 101.

In addition, the image sensor includes capacitive response characteristics as shown in FIGS. 3A and 3B. FIG. 3A shows fall-response characteristics when light allowed to be incident upon the image sensor to obtain a video signal by scanning is turned from ON to OFF at time $t=t_1$. This graph indicates that the residual image of the preceding field is high in signal level at the first field No. 1, and decreases gradually as the field Nos. increase after the turn-off time $t=1_1$. In contrast with this, FIG. 3B shows rise-response characteristics when light is allowed to be incident upon the image sensor; that is, turned from OFF to ON at time $t=t_2$. This graph indicates that the image signal level is low at the first field No. 1, but increases gradually as the field Nos. increase after the turn-on time $t=t_2$.

In summary, in the prior-art method, color is mixed or darkened due to the after-image (residual) characteritics of the image sensor. Further, when an object image of high color saturation (e.g. monochrome) is image-detected, since the image sensor is exposed to a primary color image only intermittently, the detected signal level is low due to the rise-response characteritics of the image sensor as compared with when a white color image is image-detected (This is because in the case of white color, the image sensor is exposed to primary color images continually). Therefore, the obtained field-sequential color television signal is low in color saturation.

To overcome the above-mentioned color-turbidity problem, Japanese Patent Appl. No. 61-290147 has proposed a certain technique, which comprises color separating means for alternately providing an exposure period (during which an image sensor is exposed to a primary color image from an object image to accumulate photoelectric charge) and a shading period (during which the image sensor is shaded from the primary color image); and scanning means for scanning the image sensor upon start of the shading period to output a primary color image signal of the object image as the accumulated photoelectric charge and further upon start of the exposure period to discharge the residual photoelectric charge, in order to prevent color turbidity. In this prior-art method, however, since light allowed to be incident upon the image sensor is shaded every other field, there still exists a problem in that the obtained video signals are low in color saturation due to the afore-mentioned rise response characteristics of the image sensor, and therefore it is impossible to obtain accurate video images, although color turbidity due to residual image characteristics of the image sensor can be eliminated to some extent.

SUMMARY OF THE INVENTION

It is the primary object of the present invention to provide a field-sequential color television camera which can provide field-sequential color television signals small in color turbidity among three primary colors, high in color saturation and high in image sensitivity.

To achieve the above-mentioned object, a field-sequential color television camera according to the present invention comprise: (a) color separating means for separating an image of a subject to be taken into primary-color images two fields by two fields for each primary color image in time sharing manner: (b) color image detecting means for transducing the primary color images separated by said color separating means into primary color image signals, respectively; (c) scanning means for scanning said color image detecting means to generate primary color image signals in sequence of field in synchronism with said color separating means; and (d) means for omitting each primary color image signal detected at each first field and including a preceding different-color residual image signal and selecting each primary color image signal detected at each second field and including a preceding same-color residual image signal as video signals in sequence.

The color separating means is a color separating rotary filter formed with three pairs of continual same primary color filter segments.

In the field sequential color television camera of the present invention, a object image is separated into three primary color images, each of which is further divided into a first field and a second field. Since each primary color image signal detected at the first field includes a preceding different-color residual image signal, this image signal is not used, thus preventing color turbidity due to residual image characteristics of the color image detecting means. On the other hand, since each primary color image signal detected at the second field includes a preceding same-color residual image signal, only this image signal is reproduced, thus improving low color satuaration and low response speed due to rise-response characteritics of the color image detecting means.

In practice, three primary color image signals detected at the second fields of the color separating means and including the preceding same-color residual image signals are A/D converted and stored in three memory units, separately in response to three write-enable signals. When required to be reproduced, these three primary color video signals are read simultaneously from the memory units and are D/A converted before being supplied to a color monitor.

BRIEF DESCRIPTION OF THE DRAWINGS

The features and advantages of the field-sequential color television camera according to the present invention will be more clearly appreciated from the following description of the preferred embodiment of the invention taken in conjunction with the accompanying drawings in which like reference numerals designate the same or similar elements or sections throughout the figures thereof and in which:

FIG. 5 is a block diagram showing a field-sequential color television camera to which the present invention is applied;

FIGS. 7A, 7B and 7C are illustrations for assistance in explaining the positional relationship between the filter segments of the color separating rotary filter of the present invention and the scanning line of an image tube;

DETAILED DESCRIPTION OF THE PREFERRED EMBODIMENT

The field-sequential color television camera of the present invention will be described hereinbelow with reference to the attached drawings.

Figure 1:
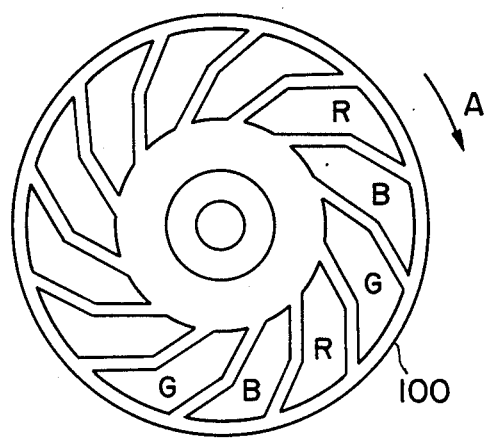
FIG. 1 is a plan view showinfg a prior-art color separating rotary filter.
Figure 2:
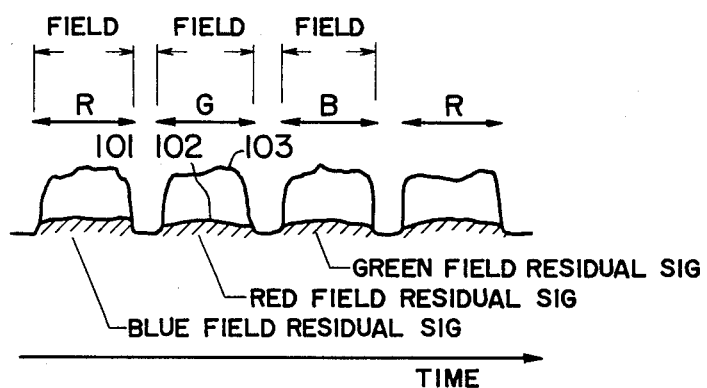
FIG. 2 is a waveform diagram for assistance in explaining prior-art residual video signals.
Figure 3A:
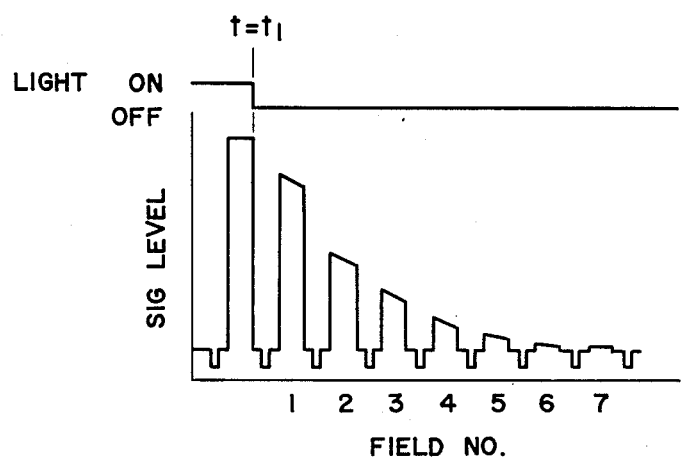
FIG. 3A is a graphical representation showing a fall-response (after-image) characteristics of an image sensor.
Figure 3B:
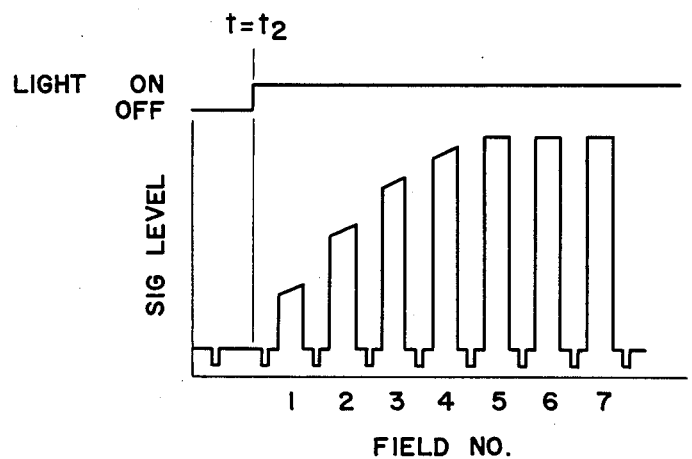
FIG. 3B is a graphical representation showing a rise-response (image-sensing) characteristics of the image sensor.
Figure 4:
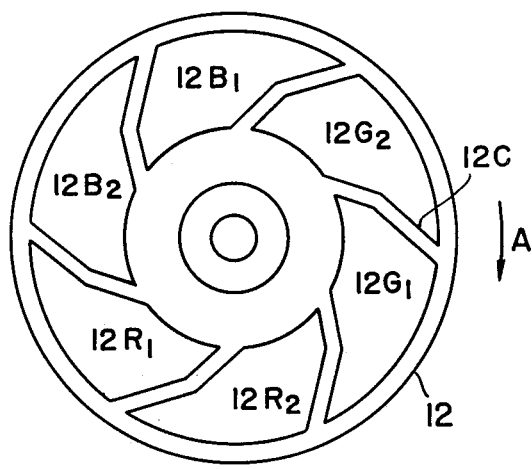
FIG. 4 is a plan view showing a color separating rotary filter of the present invention.

The camera of the present invention comprises a primary color separating rotary filter 12 (i.e. color separating means) as shown in FIG. 4. This filter is formed with three pairs of the same primary color filters $12R_1$ and $12R_2$, $12G_1$ and $12G_2$, and $12B_1$ and $12B_2$, each separated by plural doglegged shading spoke portions 12C. The red filter segments $12R_1$ and $12R_2$ transmit only red color images; the green filter segments $12G_1$ and $12G_2$ transmit only green color images; and the blue filter segments $12B_1$ and $12B_2$ transmit only blue color images. The first three primary color filter segments $12R_1$, $12G_1$ and $12B_1$ provide a first exposure period to generate a first field, respectively; while the second three primary color filter segments $12R_2$, $12G_2$ and $12B_2$ provide a second exposure period to generate a second field, respectively. That is, three pairs of first and second primary color filter segments (i.e. color fields) $12R_1$ and $12R_2$, $12G_1$ and $12G_2$ and $12B_1$ and $12B_2$ are arranged in circular form alternately two fields by two fields for each primary color image, so as to provide the first and second exposure periods respectively, when the rotary filter 12 is placed in front of an image tube and rotated by a synchronizing motor 14 shown in FIG. 5 at a constant speed in synchronism with the scanning operation of the image tube 13. Further, the positional relationship between the filter segments of the filter 12 and the scanning line position of the image tube 13 will be described later in further detail.

FIG. 5 shows a field-sequential color television camera system, which is roughly composed of a camera section 1, a frame memory section 2, and a color monitor 3. The camera section 1 comprises an image lens 11, the color separating rotary filter 12, an image tube 13, the synchronizing motor 14, a pre-amplifier 15, a signal processing circuit 16, and a camera section control circuit (i.e. controller) 17.

The image lens 11 focuses a object image to be taken onto a target film (i.e. image sensor) of the image tube 13 through the rotary filter 12. That is, the color of the object image is separated through the rotary filter 12 into three primary color images and the focused on the target film of the image tube 13. Color-separated field-sequential television signals detected by the image tube 13 are amplified by the pre-amplifier 15 and then supplied to the signal processing circuit 16. In this circuit 16, the field-sequential color television signals are processed for white-balance adjustment, clamping, blanking mixture, white clipping, gamma correction, etc. in the known manner in accordance with instructions supplied from the camera controller 17. The processed field-sequential signals are outputted to the frame memory 2 as video signals. The camera controller 17 controls the scanning operation of the image tube 13, the synchronous rotation of the synchronizing motor 14, and the synchronous control operation of the signal processing circuit 16 in response to horizontal/vertical synchronizing signals applied from a frame memory controller 24 (described later).

The frame memory section 2 comprises an A/D (analog-to-digital) converter 21, three memory units 22R, 22G and 22B, three D/A (digital-to-analog) converters 23R, 23G and 23B, and a frame memory controller 24.

Figure 6A:
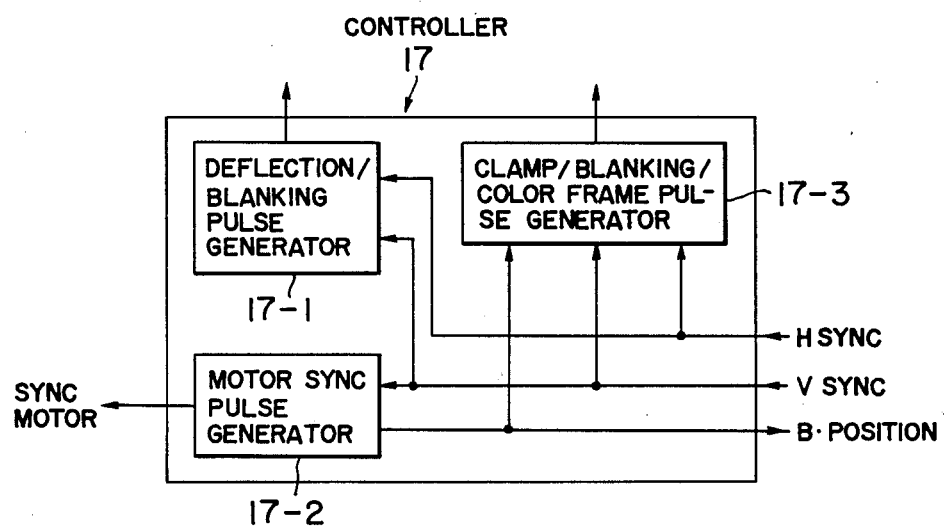
FIG. 6A is a block diagram showing a control circuit 17 incorporated in the camera section shown in FIG. 5.
Figure 6B:
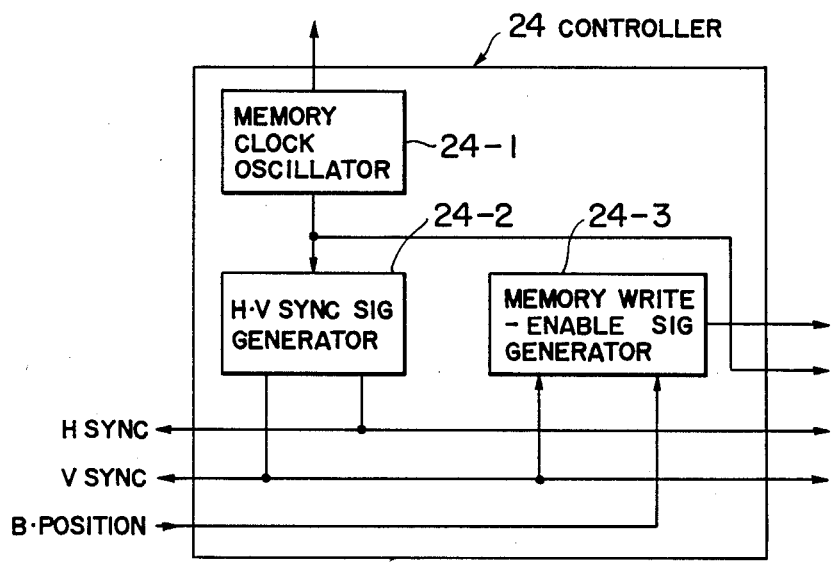
FIG. 6B is a block diagram showing another control circuit 24 incorporated in the frame memory section shown in FIG. 5.

With reference to FIG. 6B, the frame memory controller 24 comprises a memory clock oscillator 24-1, a H.V (horizontal/vertical) synchronizing signal generator 24-2 and a memory write-enable signal generator 24-3. This memory clock oscillator 24-1 generates clock signals and applies the clock signals to the A/D converter 21, the H.V synchronizing signal generator 24-2, and the three D/A converters 23R, 23G, and 23B, respectively. The H.V synchronizing signal generator 24-2 generates horizontal synchronizing signal H.SYNC and a vertical synchronizing signal V.SYNC and applies these signals to the camera controller 17 and the color monitor 3. The memory write-enable signal generator 24-3 generates three memory write-enable signals in response to the vertical synchronizing signal V.SYNC and a blue-position signal from the camera controller 17, and applies these write-enable signals to the three memory units 22R, 22G and 22B, respectively.

With reference to FIG. 6A, the camera controller 17 comprises a deflection circuit driving/blanking pulse generator 17-1; a motor synchronizing pulse generator 17-2; and a clamp/blanking/color frame pulse generator 17-3. The deflection circuit driving/blanking pulse generator 17-1 generates a deflection circuit driving pulse and a blanking pulse on the basis of the horizontal/vertical synchronizing signals H.SYNC and V.SYNC from the memory frame controller 24, and applies these pulses to the image tube 13. The motor synchronizing pulse generator 17-2 generates a synchronizing pulse and a blue-position signal in response to the vertical synchronizing signal V.SYNC and applies the synchronizing pulse to the synchronizing motor 14 and the blue-position signal to the memory-enable signal generator 24-3 of the frame memory controller 24. The clamp/blanking/color frame pulse generator 17-3 generates a clamp pulse, a blanking pulse and a color frame pulse on the basis of the horizontal/vertical synchronizing signals H.SYNC and V.SYNC and the blue-position signal, and applies these signals to the signal processing circuit 16.

In the present embodiment, assumption is made that the vertical scanning of the image tube is effected in non-interlaced scanning manner. Under these conditions, the color separating rotary filter 12 is driven by the synchronizing motor 14 at such a speed that the exposure period during which a primary color image is detected through each filter segment matches one vertical scanning period of the image tube 13 and in such a phase that the scanning line is moved vertically in synchronism with the rotational movement of the dog-legged shading portion 12C of the rotary filter 12 passing before the front surface of the image tube 13.

In the signal processing circuit 16, the well-known processings for white balancing adjustment, white clip, gamma correction, etc. are processed for each primary color signal outputted by scanning photoelectric charge accumulated in the image tube through the second exposure areas 12R$_2$, 12G$_2$ and 12B$_2$ of the rotary filter 12, that is, charged by the second field primary color image signals of the field-sequential color television signals obtained through the color separating rotary filter 12, as described in greater detail later.

The above-mentioned field-sequential color television signals supplied from the television camera 1 are stored in the frame memory unit 2 as follows: The signals are first converted into digital signals through the A/D converter 21, and only the second field signals of three primary color signals are stored in the red signal memory unit 22R, the green signal memory unit 22G and the blue signal memory unit 22B, separately, being classified according to each primary color. These digital signals once stored in the frame memory unit 2 can be processed by a computer or recorded on a recording medium as image data.

Further, when the stored image data are displayed on the color monitor 3, the stored digital signals are read from the three memory units simultaneously, converted into analog signals through the D/A converters 23R, 23G and 23B, and supplied to the color monitor 3 as simultaneous analog R-G-B signals to reproduce a object image to be displayed. Further, the operational timings of the A/D converter 21, the three memory units 22R, 22G and 22B, and the three D/A converters 23R, 23G and 23B, and the generation timings of the horizontal/vertical sinchronizing signals are all controlled by the frame memory controller 24.

The control relationship between the two controllers 17 and 24 is as follows: the controller 24 applies the horizontal/vertical synchronizing signals to the controller 17 in order to retain synchronism between the field-sequential color television camera 1 and the frame memory 2. On the other hand, the controller 17 applies a blue position signal generated at the leading edge of a blue signal to the controller 24 in order to discriminate the primary colors of the field-sequential color television signals. In more detail, in the present invention, primary colors of the field-sequential color television signals are arranged in accordance with the color filter arrangement of the color separating rotary filter 12, for instance, as follows:

$$R_1\text{-}R_2\text{-}G_1\text{-}G_2\text{-}B_1\text{-}B_2\text{-}R_1\text{-}\ldots$$

Therefore, in response to a blue-position signal indicative of B$_2$ position, the frame memory controller 24 stores signals B$_2$, R$_2$, G$_2$ in sequence every other field in the blue signal memory unit 22B, the red signal memory unit 22R, and the green signal memory unit 22G, respectively.

The operation of the embodiment of the present invention configured as described above will be explained hereinbelow with reference to FIGS. 7A to 7C, 8, and 9.

FIGS. 7A to 7C are illustrations for assistance in explaining the synchronous relationship between primary color filter exposure segments of the color separating rotary filter 12 and the scanning line operation of the image tube 13.

When the color separating rotary filter 12 is placed between the image lens 11 and the image tube 13 and rotated in synchronism with the scanning operation of the image tube 13, three primary color images of a object are forcused in sequence onto the target film of the image sensor of the image tube 13 through the image lens 11 and the rotary filter 12 during the first and second exposure (field) periods. When the color image is focused onto the image sensor, the image is transduced into photoelectric charge on the image sensor. The accumulated photoelectric charge can be outputted from the image tube 13 as a video signal by scanning the image tube 13 vertically in synchronism with the motion of the filter 12. Since the filter 12 is moved in synchronism with the scanning operation, the current photoelectric charge is accumulated on the area at which the preceding photoelectric charge has been discharged by the scanning operation.

In more detail, in FIG. 7A, (a) indicates that the first green field exposure period by the first green filter segment $12G_1$ has just ended and the second green field exposure period by $12G_2$ has started for the upper edge of the image tube 13. In this case, the scanning line of the raster is positioned on the shading spoke portion 12C, and moved in the downward direction in FIG. 7A in synchronism with the movement of the shading spoke portion 12C of the rotary filter 12. In the scanning operation shown by (a) to (c), the preceding different-color (red) residual photoelectric charge obtained during the preceding second red field exposure period by $12R_2$ and the current photoelectric charge obtained during the current first green field exposure period by $12G_1$ are discharged (outputted) by the scanning operation of the image tube 13. Simultaneously, the succeeding photoelectric charge obtained during the succeeding second green field exposure period by $12G_2$ is charged in the image tube 13. In the above scanning, it should be noted that the photoelectric charge obtained by the exposure period by $12G_2$ scarcely includes the residual red charge included in the preceding exposure period by $12G_1$, because the residual charge has already been discharged by scanning the image tube 13. On the contrary, since the image sensors 13 has already been exposed to a green image obtained in the preceding first green (the same-color) field exposure period by $12G_1$, it is possible to increase the response speed of the image tube 13 to the green image.

The photoelectric charge obtained in the second green field exposure period by the filter segment $12G_2$ and including the same-color residual charge is outputted as a primary color video signal by scanning the image tube 13 in the succeeding first blue field exposure period by the filter segment $12B_1$, as shown in FIG. 7B.

In more detail, in FIG. 7B, (d) indicates that the second green field exposure period by the second green filter segment $12G_2$ has already ended and the first blue field exposure period by $12B_1$ has started for the upper edge of the image tube 13. In the same way, the scanning lines of the raster is moved in synchronism with the movement of the shading spoke portion 12C of the rotary filter 12. In the scanning operation shown by (d) to (c), the photoelectric charge obtained during the preceding second green field exposure period by $12G_2$ and including the same-color residual charge is discharged (outputted) by the scanning operation of the image sensors. Simultaneously, the succeeding photoelectric charge obtained during the succeeding first blue field exposure period by $12B_1$ and the preceding different-color (green) residual photoelectric charge of the preceding second green field exposure period by $12G_2$ are accumulated in the image tube 13.

In FIG. 7C, (g) indicates that the first blue field exposure period by $12B_1$ has ended and the second blue field exposure period by $12B_2$ has started for the upper edge of the image tube 13. In the scanning operation shown by (g) to (i), the different-color (green) residual photoelectric charge obtained during the second green field exposure period by $12G_2$ and the current photoelectric charge obtained during the current first blue field exposure period by $12B_1$ are discharged (outputted) by the scanning operation of the image sensors. Simultaneously, charge obtained during the succeeding second blue field exposure period by $12B_2$ is accumulated in the image tube 13.

The above-mentioned photoelectric charge and discharge operations are repeated in the order of red, green and blue. In the first exposure period, a current primary color image signal ($B_1$) obtained at the first field ($12B_1$) and including a preceding different-color residual image signal ($G_2$) is charged, and a preceding primary color image signal ($G_2$) obtained at the second field ($12G_2$) and including a preceding same-color residual image signal ($G_1$) is outputted by scanning the image tube 13, as shown in FIG. 7B. On the other hand, in the second exposure period, a current primary color image signal ($B_2$) obtained at the second field ($12B_2$) and including a preceding same-color residual image signal ($B_1$) is charged, and a preceding primary color image signal ($B_1$) obtained at the first field ($12B_1$) and including a preceding different-color residual image signal ($G_2$) is outputted by scanning the image tube 13, as shown in FIG. 7C.

FIG. 4 shows the relationship between the video signals (photoelectric charges outputted from the image tube 13) and various synchronizing signals. In 8(A), the labels (a) to (i) correspond to those shown in FIGS. 7A to 7C. That is, in the status shown by (a) in FIG. 7A, the first green video signal begins to be outputted as shown by (a) in FIG. 8. Similarly, in the status shown by (b) in FIG. 7A, the first green video signal is being outputted (photoelectric charge is being discharged) as shown by (b) in FIG. 8, and so on.

Figure 8:
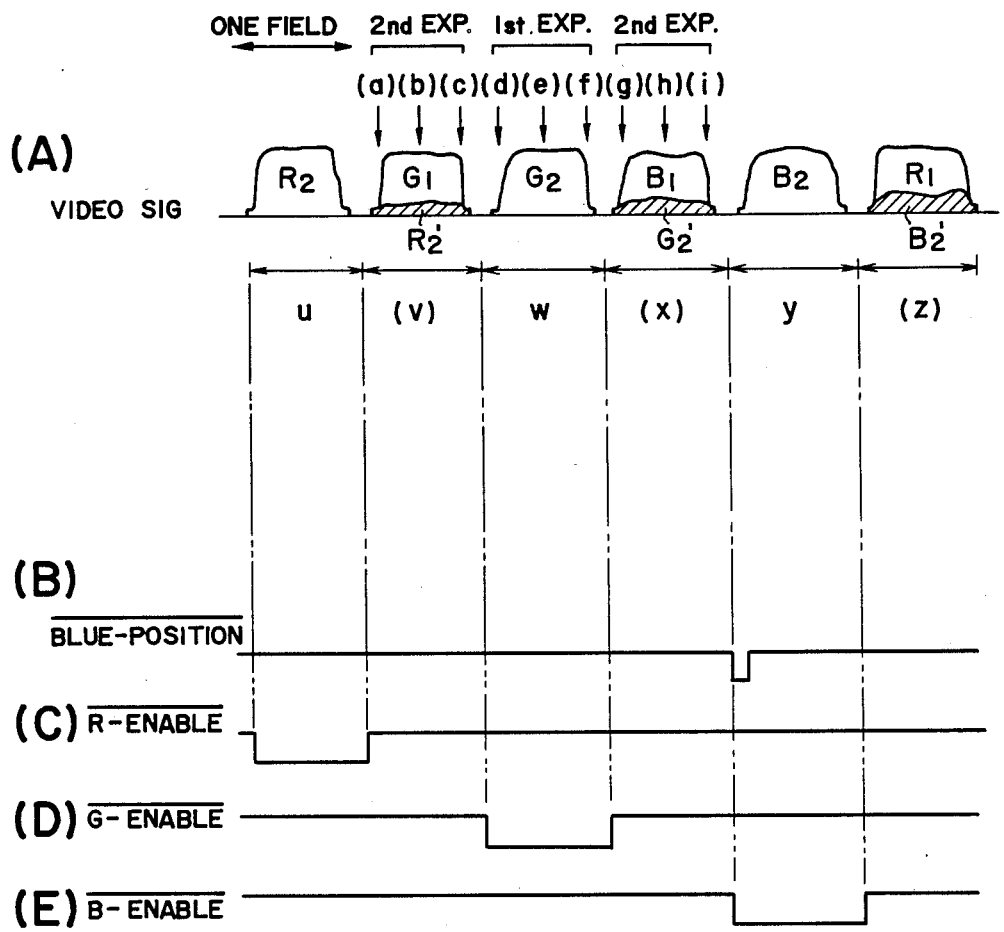
FIG. 8 is a timing chart of the video signals and the other synchronizing signals of the television camera according to the present invention.

As shown by (A) in FIG. 8, the field-sequential color television signals of the present invention are generated in sequence of the second red field signal $R_2$, the first green signal $G_1$, the second green field signal $G_2$, the first blue field signal $B_1$, the second blue field signal $B_2$, and the first red field signal $R_1$ at primary color fields from u to z, respectively.

As already explained, an addition signal of green field signal $G_1$ and residual red field signal $R_2'$ is present at the field (v); an addition signal of blue field signal $B_1$ and residual green field signal $G_2'$ is present at the field (x); an addition signal of the red field signal $R_1$ and residual blue field signal $B_2'$ is present at the field (z). On the other hand, only red field signal $R_2$, green field signal $G_2$ and blue field signal $B_2$ are present at the fields u, w and y, respectively, because each corresponding residual signals $B_2'$, $R_2'$ and $G_2'$ have already been discharged.

On the other hand, the camera controller 17 in the field-sequential color television camera 1 generates a blue-position signal $\overline{\text{B-POSITION}}$ to the frame memory controller 24 at the start of the field y, that is, the leading edge of the second blue field signal $B_2$, as depicted by (B) in FIG. 8. In response to this blue-position signal, the frame controller 24 generates three primary color write-enable signals $\overline{\text{R-ENABLE}}$, $\overline{\text{G-ENABLE}}$ and $\overline{\text{B-ENABLE}}$, as depicted by (C), (D) and (E) in FIG. 8. The red-enable signal has a pulse width including the field u; the green-enable signal has a pulse width including the field w; the blue-enable signal has a pulse width including the field y, respectively. On the basis of these three write-enable signals, the three second primary color field video signals $R_2$, $G_2$ and $B_2$ are written in the three memory units 22R, 22G and 22B, respectively. In other words, the three first primary color field signals $G_1$, $B_1$ and $R_1$ including different-color residual signals, respectively will not be written in the memory units, and therefore omitted.

Figure 9:
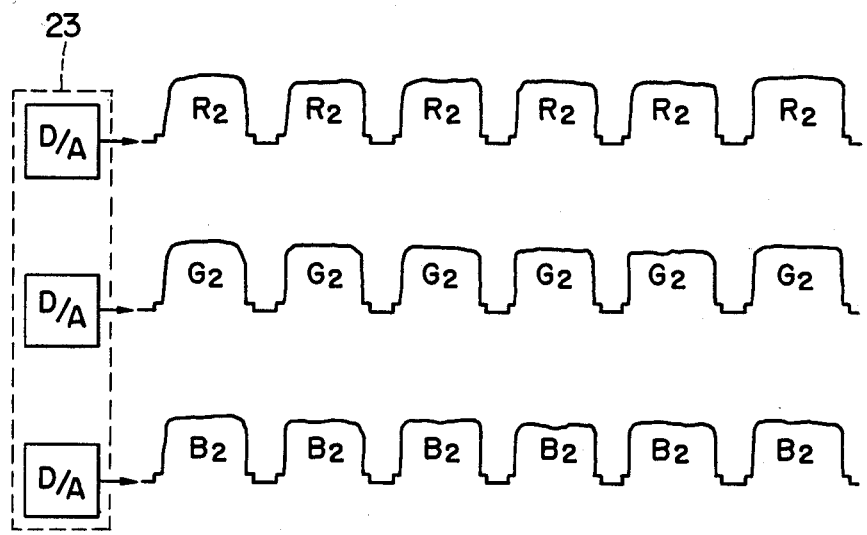
FIG. 9 is a waveform diagram for assistance in explaining video signals read from three memory units and given to a color monitor via three D/A converters.

These field-sequential color television signals written in the memory units 22R, 22G and 22B, respectively are read out simultaneously by the controller 24, converted into three analog signals through the converters 23R, 23G and 23B, respectively, and supplied to the color monitor 3 as simultaneous analog RGB signals, as shown in FIG. 9, to reproduce images of a subject to be displayed.

In the embodiment of the present invention, an image tube is used for the image detecting means and a disk-shaped color separating rotary filter is explained as the color separating means. However, without being limited thereto, it is of course possible to use a solid-state image sensing element (e.g. charge coupled device) as the image detecting means and an endless band-shaped circulating filter as the color separating means.

As described above, in the field-sequential color television camera according to the present invention, three primary color images of a subject to be displayed are applied to an image sensor for accumulating photoelectric charge by dividing each primary color image into two continual fields, that is, by dividing each primary color image exposure period into two first and second field exposure periods. In the second exposure periods, the photoelectric charge obtained in the first color field exposure period (including the different-color residual charge) is first discharged and then the photoelectric charge obtained in the second color field exposure period (including the same-color residual charge) is charged. In the succeeding first exposure period, the photoelectric charge charged in the preceding second exposure period is discharged. That is, since each primary color image signal can be detected after the preceding same color image signal including different-color residual signal has been outputted, it is possible to eliminate the influence of residual image signal and increase response speed, thus generating field-sequential color television signals small in color turbidity of three primary colors and high in color saturation, and high in response speed.

What is claimed is:

1. A field-sequential color television camera for generating primary color signals of an object image to be taken in sequence of fields, wherein a object image is separated into primary color images two fields by two fields for each primary color image before transduced into primary color image signals; and each primary color image signal transduced at each first field and including a preceding different-color residual image is omitted, while each primary color image signal transduced at each second field and including a preceding same-color residual image signal is outputted as video signals in sequence.

2. The field-sequential color television camera of claim 1, wherein a object image is separated into three primary color images two fields by two fields for each primary color image by color separating rotary filter formed with three pairs of continual same primary color filter segments.

3. A field-sequential color television camera comprising:
    (a) color separating means for separating an image of a subject to be taken into primary-color images two fields by two fields for each primary color image in time sharing manner;
    (b) color image detecting means for transducing the primary color images separated by said color separating means into primary color image signals, respectively;
    (c) scanning means for scanning said color image detecting means to generate primary color image signals in sequence of fields in synchronism with said color separating means; and
    (d) means for omitting each primary color image signal detected at each first field and including a preceding different-color residual image signal and selecting each primary color image signal detected at each second field and including a preceding same-color residual image signal as video signals in sequence.

* * * * *